(12) United States Patent
Kim

(10) Patent No.: US 11,055,509 B2
(45) Date of Patent: Jul. 6, 2021

(54) DISPLAY APPARATUS WITH CORRECTION OF SENSOR CALIBRATION IMAGE DATA AND METHOD FOR CONTROLLING THE SAME

(71) Applicant: SAMSUNG DISPLAY CO., LTD., Yongin-si (KR)

(72) Inventor: Kee Yong Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/672,043

(22) Filed: Nov. 1, 2019

(65) Prior Publication Data

US 2020/0143135 A1 May 7, 2020

(30) Foreign Application Priority Data

Nov. 1, 2018 (KR) .......................... 10-2018-0133056

(51) Int. Cl.
*G06K 9/00* (2006.01)

(52) U.S. Cl.
CPC ....... *G06K 9/0004* (2013.01); *G06K 9/00067* (2013.01)

(58) Field of Classification Search
CPC . G06K 9/0004; G06K 9/00067; G06F 3/0418
See application file for complete search history.

(56) References Cited

U.S. PATENT DOCUMENTS

| 2007/0047777 | A1  | 3/2007 | Adachi et al. |
| 2014/0119500 | A1* | 5/2014 | Akahori ................. A61B 6/585 |
| | | | 378/17 |
| 2017/0262690 | A1  | 9/2017 | Zhang |
| 2018/0260803 | A1* | 9/2018 | Seol .................... H04M 1/7253 |
| 2019/0228740 | A1* | 7/2019 | Aflatooni .......... G06K 9/00013 |

FOREIGN PATENT DOCUMENTS

| EP | 3190545 A1 | 7/2017 |
| JP | 4408965 B2 | 4/1998 |
| JP | 2008-022287 A | 1/2008 |
| JP | 4974963 B2 | 11/2009 |
| KR | 10-0561851 | 3/2006 |
| KR | 10-0627492 | 9/2006 |
| KR | 10-1857933 B1 | 5/2017 |
| KR | 10-2017-0106425 A | 9/2017 |
| KR | 10-1780231 | 9/2017 |
| KR | 10-1798622 | 11/2017 |
| WO | WO 2017/129126 A1 | 8/2017 |

\* cited by examiner

*Primary Examiner* — Stephen G Sherman
(74) *Attorney, Agent, or Firm* — Lewis Roca Rothgerber Christie LLP

(57) ABSTRACT

A display device includes: a display portion that includes a plurality of pixels, and displays an image through light emitted from the plurality of pixels; a sensor that includes a plurality of light sensing pixels that receive light and acquires a first image when the display portion displays a test image that includes a marker; a memory that stores calibration image data for calibrating an image acquired by the sensor; and a sensor controller that calculates a movement amount of a marker in the first image and corrects or updates the calibration image data using the movement amount of the at least one marker.

16 Claims, 15 Drawing Sheets

| Raw(Shift) | 0.0PIX | 0.3PIX | 0.3PIX | 1.5PIX | 1.5PIX |
|---|---|---|---|---|---|
| CAL Data(Shift) | 0.0PIX | 0.0PIX | 0.3PIX | 0.0PIX | 1.5PIX |
| MAX | 37885 | 39443 | 37885 | 42751 | 37885 |
| MIN | 37885 | 28093 | 26518.6 | 5248 | 0 |
| AVG | 37885 | 37845.807 | 37821.053 | 37688.521 | 37567.281 |
| STDEV | 0 | 582.01622 | 0.2862287 | 1172.823 | 0.2499993 |

DISPLAY APPARATUS WITH CORRECTION OF SENSOR CALIBRATION IMAGE DATA AND METHOD FOR CONTROLLING THE SAME

CROSS-REFERENCE TO RELATED APPLICATION

This application claims priority to and the benefit of Korean Patent Application No. 10-2018-0133056 filed in the Korean Intellectual Property Office on Nov. 1, 2018, the entire contents of which are incorporated herein by reference.

BACKGROUND

1. Field

The present disclosure relates to a display device and a method for controlling the same, and more particularly to a display device that can sense a fingerprint.

2. Description of the Related Art

Recently, various terminal and wearable devices have been provided with function or for functions that utilize personal information such as finance, security, and the like, and thus the importance of security authentication has increased. For example, at least one security mechanism may be installed in a personal portable electronic device such as a digital camera, a tablet PC, a notebook computer, and the like to protect personal information of a user.

User authentication with respect to an electronic device or a system may be carried out through a single or a plurality of formats of biometric identifiers (ID), and the authentication can be used alone or by adding existing password authentication methods. For example, an authentication method utilizing biometric identification may authenticate a user by using fingerprints, irises, voices, faces, blood vessels, and the like. Biometric characteristics used in authentication vary from person to person, and may have convenience of possession, may have limited risk of theft or imitation, and/or may not change frequently during one's life.

In particular, biometric authentication is becoming more commercialized for various reasons such as convenience, security, and economy. A biometric sensor may be embedded in an electronic device or system to acquire a biometric data (eg. a fingerprint image of a finger) of a user. Specifically the biometric sensor may acquire the fingerprint image by directly or indirectly contacting the finger, and may be able to acquire a fingerprint pattern from the fingerprint image.

The above information disclosed in this Background section is only for enhancement of understanding of the present disclosure and therefore it may contain information that is not prior art to the present disclosure.

SUMMARY

Aspects of embodiments of the present disclosure are directed to a display device that carries out biometric authentication by using light from a display portion, and a control method thereof.

Aspects of embodiments of the present disclosure are directed to a display device that acquires a fingerprint image that is stationary even when a fingerprint moves with respect to the sensor, and a control method thereof.

According to an embodiment of the present disclosure, a display device is provided, the display device including: a display portion that includes a plurality of pixels configured to display an image through light emitted from the plurality of pixels; a sensor that includes a plurality of light sensing pixels configured to receive light and acquire a first image when the display portion displays a test image that includes a marker; a memory configured to store calibration image data for calibrating the image; and a sensor controller configured to calculate a movement amount of the marker in the first image and to update the calibration image data using the movement amount of the marker.

The calibration image data may include a plurality of image pixels, each having a grayscale value, and the sensor controller may generate a weight value map by calculating a movement amount of the marker, and may apply the weight value map to the plurality of image pixels in the calibration image data to correct the calibration image data.

The memory may be configured to store a first image profile, the first image profile being acquired at generation of the calibration image data by displaying the test image by the display portion, and the sensor controller may be configured to generate a second image profile from the first image, and to calculate the movement amount of the at least one marker by comparing the first image profile with the second image profile.

The marker may have an X-shape with a white grayscale value with a center point that has a black grayscale value.

The sensor controller may be configured to calculate the movement amount of the marker by comparing a position corresponding to a minimum grayscale value of the marker in the first image profile with a position corresponding to a minimum grayscale value of the marker in the second image profile.

The sensor controller may be configured to calculate the movement amount of the marker by comparing a minimum grayscale value of the marker in the first image profile with a minimum grayscale value of the marker in the second image profile.

The sensor controller may be configured to apply the updated calibration image data to a fingerprint image acquired by the sensor.

The sensor may be at a rear side of the display portion.

The display portion may include a display area where an image is displayed and a non-display area at at least one side of the display area, and the sensor may correspond to a fingerprint sensing area in the display area.

The display device may further include: a touch sensor that is at a front side of the display portion; and a window that is at a front side of the touch sensor.

When the touch sensor senses a touch at a touched area in the fingerprint sensing area, the display portion may be configured to control pixels at the touched area to emit light, and the sensor may be configured to drive light sensing pixels at the touched area.

According to another embodiment of the present disclosure, a method of controlling a display device is provided, the method including: acquiring a first image, by a sensor that includes a plurality of light sensing pixels, when a display portion of the display device displays a test image that includes a marker; calculating a movement amount of the marker from the first image; and updating calibration image data based on the movement amount of the marker, wherein the calibration image data is to be applied to a fingerprint image acquired by the sensor.

The calibration image data comprises a plurality of image pixels, each having a grayscale value, and the updating the calibration image data may include generating a weight value map by calculating a movement amount of the marker, and applying the weight value map to the plurality of image pixels in the calibration image data.

The generating the weight value map by calculating the movement amount of the marker may include: generating a second image profile from the first image; and calculating the movement amount of the marker by comparing the second image profile with a first image profile acquired at generation of the calibration image data by displaying, by the display portion, the test image.

The marker may have an X-shape with a white grayscale value with is formed in the shape of the letter X having a center point having a black grayscale value.

The calculating the movement amount of the marker may include comparing a position corresponding to a minimum grayscale value of the marker in the first image profile with a position corresponding to a minimum grayscale value of the marker in the second image profile.

The calculating the movement amount of the marker may include comparing a minimum grayscale value of the random marker in the first image profile with a minimum grayscale value of the marker in the second image profile.

The control method of the display device may further include applying the updated calibration image data to a fingerprint image acquired by the sensor.

The display portion may include a display area where an image is displayed and a non-display area at at least one side of the display area, and the sensor may correspond to a fingerprint sensing area in the display area.

The acquiring a first image may include: sensing, by a touch sensor, a touch at a touched area in the fingerprint sensing area; emitting light, by the display portion, from pixels located in the touched area; and driving, by the sensor, light sensing pixels located in the touched area.

According to exemplary embodiments, a fingerprint image from which noise is removed can be acquired.

According to exemplary embodiments, a fingerprint recognition rate can be improved.

BRIEF DESCRIPTION OF THE DRAWINGS

FIG. 15 is a table that shows standard deviations of fingerprint images acquired using corrected calibration data according to embodiments of the present disclosure.

DETAILED DESCRIPTION

Figure 1:
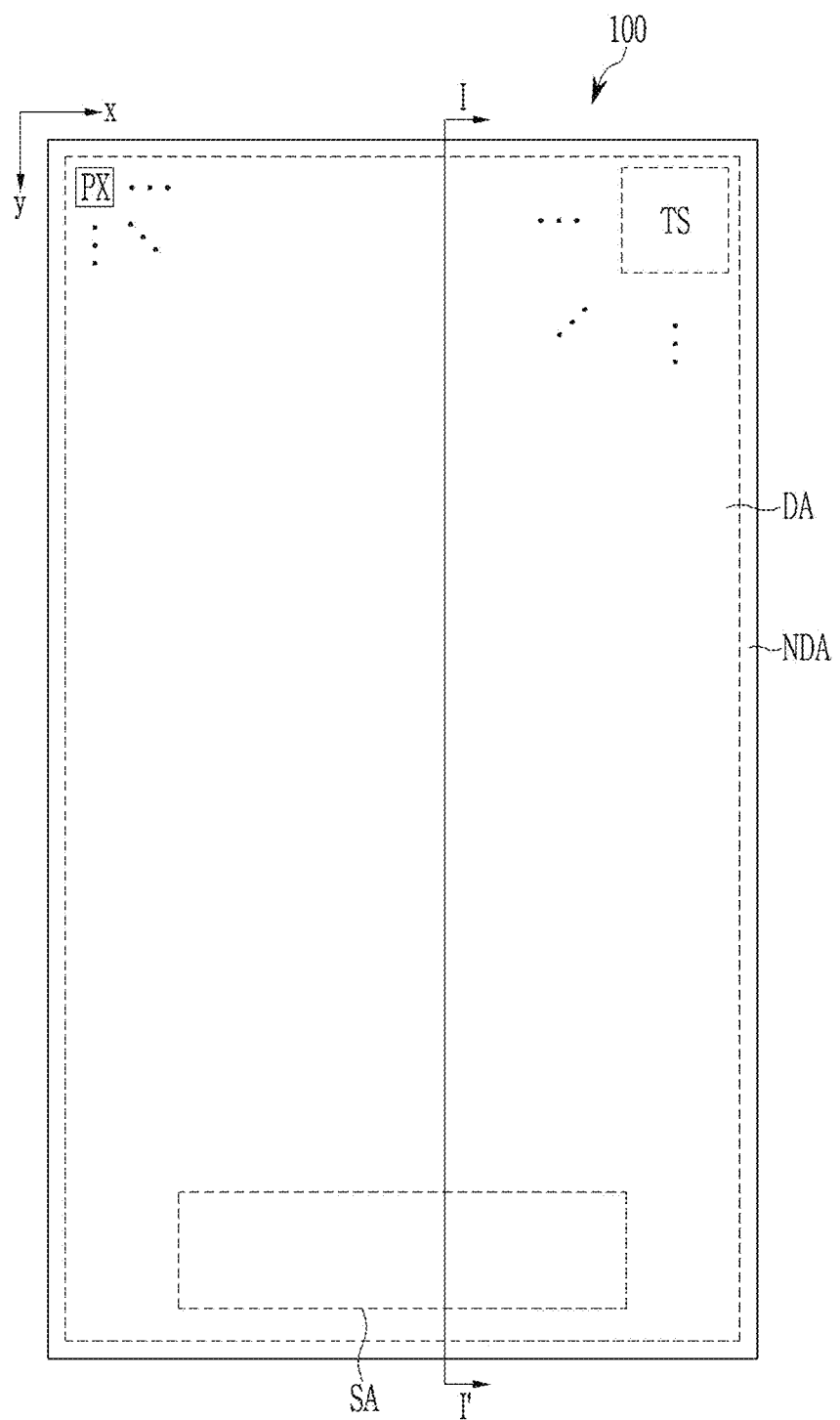
FIG. 1 is a top plan view of a part of a display device according to embodiments of the present disclosure.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, it will also be understood that when an element or layer is referred to as being "between" two elements or layers, it can be the only element or layer between the two elements or layers, or one or more intervening elements or layers may also be present. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In addition, unless explicitly described to the contrary, the word "comprise" and variations such as "comprises" or "comprising" will be understood to imply the inclusion of stated elements but not the exclusion of any other elements.

In addition, in this specification, the phrase "on a plane" means viewing a target portion from the top, and the phrase "on a cross-section" means viewing a cross-section formed by vertically cutting a target portion from the side.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein, such as the touch controller 315, the display controller 325, the display driver 320, the sensor controller 335, and/or the sensor driver 330 may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Figure 2:
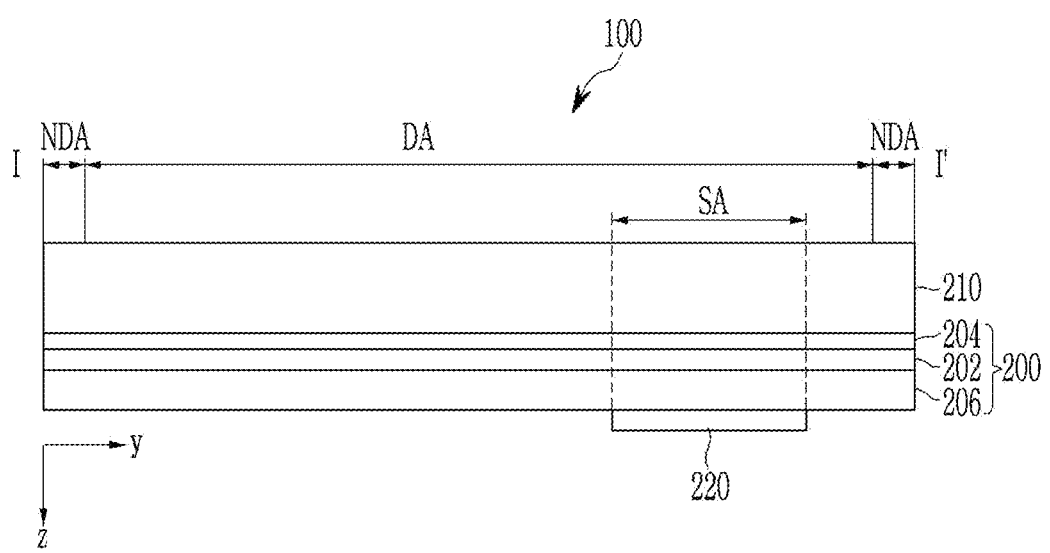
FIG. 2 is a cross-sectional view of FIG. 1, taken along the line I-I'.

FIG. 1 is a top plan view of a part of a display device according to embodiments of the present disclosure, and FIG. 2 is a cross-sectional view of FIG. 1, taken along the line I-I'.

Referring to FIG. 1 and FIG. 2, a display device 100 according to an exemplary embodiment may include a display panel 200 and a window 210 disposed on the display panel 200.

The display panel 200 may display visual information such as text, videos, photos, 2-dimensional or 3-dimensional images, and the like through the surface thereof. The display panel 200 displays an image, and may have various types including but not limited to LCD, LED, and OLED. Hereinafter, the display panel 200 will be exemplarily described as a panel including organic light emitting diodes (OLED) as light emitting elements. However, the type of the display panel 200 is not limited thereto. Persons of skill in the art will recognize that other suitable types of display device exist, and such suitable types of display device are considered to be within the scope of the present disclosure.

The display panel 200 may have various shapes. For example, the display panel 200 may be formed in the shape of a rectangle having two pairs of parallel sides. For better understanding and ease of description, the display panel 200 is illustrated herein as a rectangle having a pair of long sides and a pair of short sides.

However, the shape of the display panel 200 is not limited thereto, and it may have various shapes. For example, in some embodiments, the display panel 200 may have various shapes such a closed-shaped polygon having straight lined sides, a circle having a curved side, an oval, a semi-circle having straight lined and curved sides, a semi-elliptical shape, and the like. At least a part of corners of the display panel 200 may be formed in the shape of a curved line.

The display panel 200 may be wholly or at least partially flexible.

The display panel 200 can display an image. The display panel 200 may include a display portion 202, and the display portion 202 may include a display area DA where an image is displayed and a non-display area NDA disposed at at least one side of the display area DA. For example, the non-display area NDA may be formed in a shape that surrounds the display area DA.

The display area DA may have a shape that corresponds to the shape of the display panel 200. For example, similar to the shape of the display panel 200, the display area DA may include a closed polygon shape including straight lined sides, a circle or ellipse shape including curved line sides, a semi-circle or semi-ellipse shape including a straight line and a curved line sides, and the like. In an exemplary embodiment of the present invention, the display area DA is formed in the shape of a rectangle.

A plurality of pixels PX and a plurality of touch sensing pixels TS may be disposed in the display area DA. A display driver 320 (refer to FIG. 3) that drives the plurality of pixels PX may be disposed in the non-display area NDA.

A fingerprint sensing area SA that senses a fingerprint may be disposed in the display area DA. The fingerprint sensing area SA may be formed with a size and a shape that enables a fingerprint of a user to be sensed. For better understanding and ease of description, the fingerprint sensing area SA will be described herein as being formed in the shape of a rectangle, but the present disclosure is not limited thereto, and other suitable shapes are considered to be within the scope of the present disclosure. In some embodiments, the fingerprint sensing area SA may have a shape of a circle, an oval, a semi-circle, a polygon, and the like.

In some embodiments, the fingerprint sensing area SA may be provided in the display area DA. For example, the fingerprint sensing area SA may be disposed throughout the display area DA (e.g., may be disposed throughout the entire display area DA or may be coextensive with the display area DA) or may be disposed in a part of the display area DA. The fingerprint sensing area SA may be provided in various locations not limited to the display area DA. For example, a part of the fingerprint sensing area SA may be provided in the non-display area NDA.

In some embodiments, light transmittance of at least a part of the window 210 and the display panel 200 of the fingerprint sensing area SA (e.g., disposed in the fingerprint sensing area SA) may be higher than light transmittance of the window 210 and the display panel 200 of an area other than the fingerprint sensing area SA to provide for sensing a fingerprint using light transmitted through the fingerprint sensing area SA. In some embodiments, light incident on the fingerprint sensor 220 may be increased as light transmittance of the fingerprint sensing area SA is increased.

The window 210 may be disposed above the display panel 200. The window 210 may have a shape that corresponds to the shape of the display panel 200, and may cover at least a part of the entire surface of the display panel 200. For example, when the display panel 200 has a rectangular shape, the window 210 may also have a rectangular shape. Alternatively, when the display panel 200 has a circular shape, the window 210 may also have a circular shape.

An image displayed in the display panel 200 is transmitted to the outside through the window 210. The window 210 may prevent the display panel 200 from breaking or malfunctioning due to an external impact by absorbing the external impact. The external impact may be a force applied from outside the display device 100, which can be expressed as a pressure, stress, and the like, and which may cause a defect in the display panel 200.

The window 210 may be wholly or at least partially flexible.

Specifically, the display panel 200 may include a substrate 206, the display portion 202 disposed on the substrate 206, the fingerprint sensor 220 disposed on a rear side of the substrate 206, and a touch sensor 204 disposed on the display portion 202.

The substrate 206 may be formed of, for example, various materials such as glass, a polymer metal, and the like. The substrate 206 may be an insulation substrate made of a polymer organic material. The insulation substrate including a polymer organic material may include, polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, and the like. In some embodiments, the material that forms the substrate 206 may be made of fiberglass reinforced plastic (FRP).

The display portion 202 may be disposed above the substrate 206. The display portion 202 may display information input by a user or information provided to the user as an image. The display portion 202 may include a plurality of pixels PX. In some embodiments, the plurality of pixels PX may be organic light emitting elements, each including an organic layer, but is not limited thereto. In some embodiments, the pixel PX may be implemented in various forms such as a liquid crystal element, an electrophoretic element, an electrowetting element, and the like. The plurality of pixels PX may be disposed in the display area DA of the substrate 206. Each pixel PX may include an organic light emitting element that emits light of white and/or a color, as a unit (e.g., a minimum unit) for displaying an image. In some embodiments, each pixel PX may emit light of any one of red, green, and blue, and white, but the present disclosure is not limited thereto, and in some embodiments each pixel PX may emit light of cyan, magenta, yellow, and the like. Each pixel PX may include transistors connected to a plurality of signal wires, and an organic light emitting diode that is electrically connected with the transistors.

The touch sensor 204 may be mounted on the display portion 202 in the form of a separate panel or film, or may be integrally formed with the display portion 202.

The touch sensor 204 may include a plurality of touch sensing pixels TS to sense a location of a touch when the touch is made by a user. The touch sensing pixel TS may sense touch by using a mutual capacitance method or a self-capacitance method. The touch sensor 204 may receive a driving signal from a touch controller 315 (refer to FIG. 3), and may transmit a touch sensing signal that varies according to the user's touch to the touch controller 315.

The fingerprint sensor 220 includes a plurality of light sensing pixels. In FIG. 2, for convenience of illustration, the fingerprint sensor 220 is disposed at a rear side of the substrate 206, but the present disclosure is not limited thereto. For example, in some embodiments, the fingerprint sensor 220 may be disposed between the substrate 206 and the display portion 202.

In addition, the fingerprint sensor 220 may be provided in the fingerprint sensing area SA of the substrate 206. In FIG. 2, the fingerprint sensing area SA is disposed corresponding to a part of the display area DA, but as previously described, the fingerprint sensing area SA may be disposed corresponding to the entire area of the display area DA. In this case, the fingerprint sensor 220 may be disposed corresponding to the entire area of the display area DA. In some embodiments, the fingerprint sensor 220 may be connected to a sensor driver 330 (refer to FIG. 3) through, for example, a wire, a flexible printed circuit board, a tape carrier package, a connector, or a chip-on-film.

The fingerprint sensor 220 may sense a user's fingerprint by using light generated by the display portion 202. Specifically, light output by the display portion 202 may be reflected by the user's finger that directly contacts the display device 100 (e.g., directly contacts a surface of the window 210) or is in the vicinity of the display device 100 and is thus incident on the display portion 202. Light incident on the display portion 202 as a result of being reflected by the user's finger may have information of at least a part of the finger (e.g., information regarding the part of the user's finger may be discernable from the incident light). The information may include, for example, a spatial pattern of ridge and valley portions of a lighted portion of the finger. Thus, the fingerprint sensor 220 may be formed to capture at least a part of the reflected light to detect the spatial pattern and a location of the ridge and valley portions of the lighted portion of the finger, for example by an optical imaging and/or light detection operation. The detected spatial pattern and locations of the ridge and valley portions of the lighted portion of the finger may be processed to form a fingerprint pattern and carry out fingerprint recognition. For example, the fingerprint sensor 220 may determine whether a detected fingerprint matches a pre-stored verified user fingerprint pattern.

The fingerprint sensor 220 may be an optical sensor or an image sensor. When the fingerprint sensor 220 is provided as an optical sensor, the fingerprint sensor 220 may recognize a fingerprint of a user by distinguishing a difference of reflected light that varies depending on whether the fingerprint of the user reflecting light on the display panel 200 (e.g., contacting the display device 100 or the window 210) is the ridge portion or the valley portion. When the fingerprint sensor 220 is provided as an image sensor, the fingerprint sensor 220 captures an image of a user's fingerprint reflecting light on the display panel 200 (e.g., contacting the display device 100 or the window 210) and compares the captured image with a reference fingerprint pattern to recognize the user's fingerprint. The image sensor may include an image capture constituent element such as an active pixel sensor (e.g., a CMOS sensor), a random digital image capture device (e.g., a CCD device), a random image capture device (e.g., an optical sensitive film camera), and the like.

The fingerprint sensor 220 may enable recognition of a fingerprint both when the user's fingerprint touches and when the user's finger moves while in the touched state.

Figure 3:
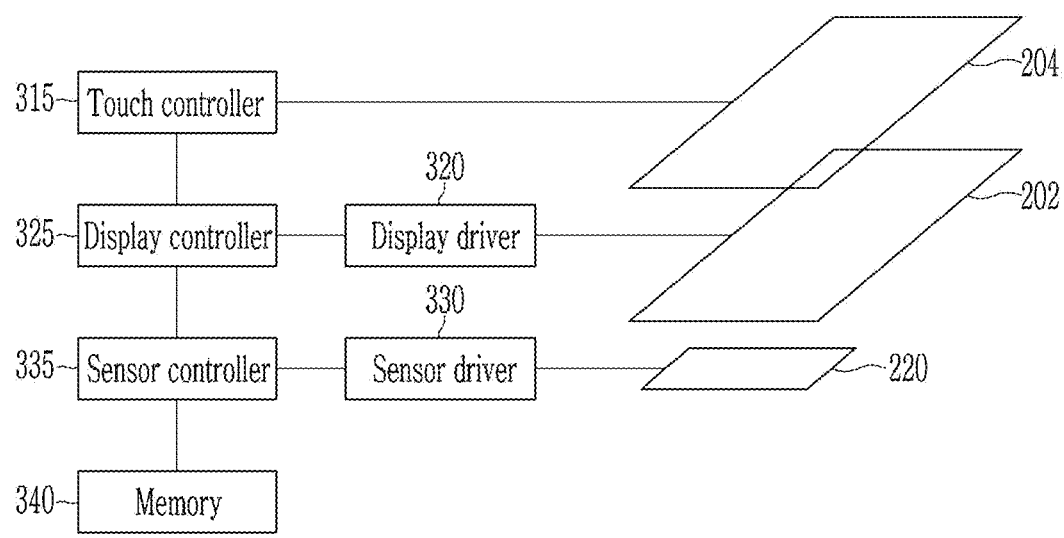
FIG. 3 is a block diagram of a display device according to embodiments of the present disclosure.

FIG. 3 is a block diagram of a display device according to embodiments of the present disclosure. Referring to FIG. 3, the display portion 202, the touch sensor 204, and the fingerprint sensor 220 are connected with a display driver 320, the touch controller 315, and a sensor driver 330, respectively. In addition, the display driver 320 and the sensor driver 330 are connected with a display controller 325 and a sensor controller 335, respectively.

The display driver 320 may include a gate driver and a data driver that supply signals to pixels PX included in the display portion 202. The display controller 325 may control an image display operation of the display portion 202 by supplying a driving signal to the display driver 320.

For example, the gate driver may generate gate signals based on the driving signal received from the display controller 325, and output the gate signals to gate lines connected to the pixels PX. The gate driver may be simultaneously formed with the pixels PX through a thin film process. For example, the gate driver may be implemented in the formed of an amorphous silicon thin film transistor (TFT) gate driver circuit (ASG) or an oxide semiconductor TFT gate driver circuit (OSG) in the non-display area NDA. The data driver may generate grayscale voltages according to image data provided from the display controller 325 based on the driving signals received from the display controller 325. The data driver may output the grayscale voltage to data lines connected to the pixels PX, as data voltages.

The display controller 325 may generate the driving signal using an image signal supplied by an external image source, a data enable signal, and a clock signal. For example, the display controller 325 may receive an image signal and a control signal from an external image source, and the control signal may include a vertical synchronization signal that distinguishes frame sections, a horizontal synchronization signal that distinguishes a row in one frame, a data enable signal, which is in a high level only for a period during which data is output, and clock signals. In addition, the driving signal may include a gate/data driver driving signal.

The touch controller 315 may generate a driving signal output to the touch sensor 204, and may receive a sense signal input from the touch sensor 204. The touch controller 315 may determine whether or not a touch screen is touched, the number of touch inputs, a touch input location, and the like by using the driving signal and the sense signal.

The sensor driver 330 may include a scan driver that applies a scan signal to light sensing pixels included in the fingerprint sensor 220, and a lead-out driver that receives signals output from the light sensing pixels.

The sensor controller 335 may include at least one processor that controls operation of the sensor driver 330, processes a fingerprint pattern according to a signal (e.g., an electrical signal) transmitted from the sensor driver 330, and determines whether an input fingerprint pattern is a fingerprint pattern of an authorized user. The fingerprint sensor 220 is used to acquire a fingerprint and compare the acquired fingerprint to a stored fingerprint to enable or disable the display device 100 or a function of a system that includes the display device 100.

In addition, the sensor controller 335 may output a control signal to the display controller 325 such that the display portion 202 can provide lighting to capture a fingerprint pattern when the sensor controller 335 carries out a fingerprint sensing operation. Here, in the display portion 202, pixels PX corresponding to an area where a user's finger is placed may emit light. For example, pixels PX in a location corresponding to the fingerprint sensing area SA may emit light. Alternatively, when a location where a user's finger touched is sensed, pixels PX correspond to the sensed location may emit light for sensing the fingerprint. When the fingerprint sensor 220 is activated due to existence of a touch with respect to the touch sensor 204, pixels PX in a touched location may emit light with high brightness such that a fingerprint sense contrast can be improved.

A fingerprint image acquired by the fingerprint sensor 220 may include noise generated due to image interference by an internal structure of the display panel 200, such as an electrode pattern, a wiring pattern, and the like. The sensor controller 335 may correct the acquired fingerprint image by using a pre-stored calibration image. Calibration image data may be stored in a memory 340 as data for removing the noise due to the image interference and the like. The calibration image may include a plurality of image pixels, and each image pixel may include a grayscale value.

That is, when a fingerprint image is acquired, the sensor controller 335 may correct the acquired fingerprint image by using the calibration image data stored in the memory 340. However, when a location of the fingerprint sensor 220 is changed in the display device 100, a noise of the fingerprint image cannot be easily removed when the calibration image data stored in the memory 340 is used. This will be described with reference to FIG. 4.

Figure 4:
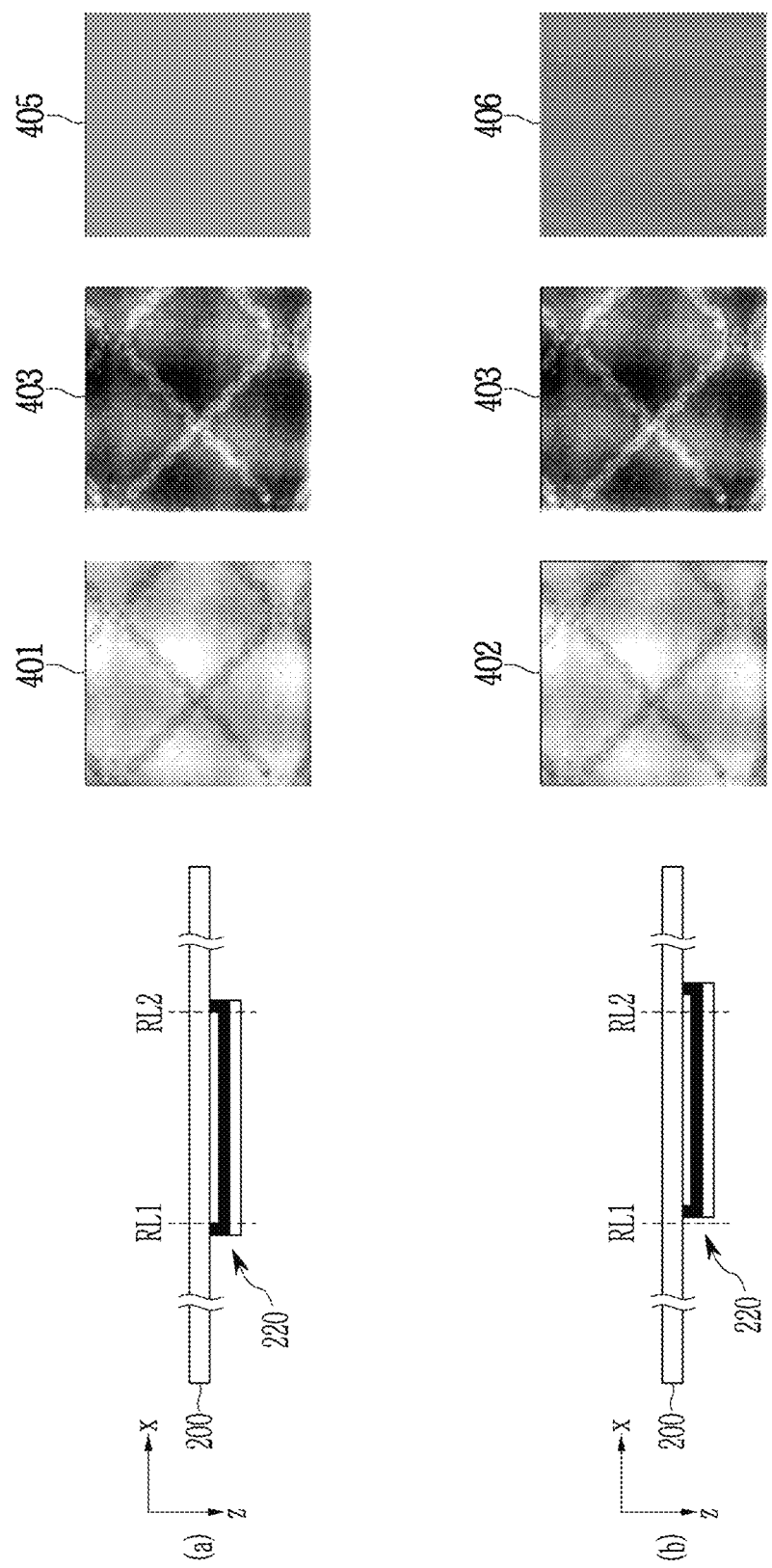
FIG. 4 shows an example of a fingerprint image acquired by the fingerprint sensor when the fingerprint sensor is moved.

FIG. 4 shows an example of a fingerprint image acquired by the fingerprint sensor when the fingerprint sensor is moved.

As shown in (a) of FIG. 4, an image 401 is acquired through the fingerprint sensor 220 at an initial location of the fingerprint sensor 220 between reference lines RL1 and RL2. When a calibration image 403 is applied to the image 401, an image 405 where noise is removed is acquired.

As shown in (b) of FIG. 4, when the fingerprint sensor 220 moves outside the reference line RL2 along the x-axis direction, an image 402 is acquired through the fingerprint sensor 220. When the calibration image 403 is applied to the image 402, an image 406 that includes noise is acquired. Since a location of the fingerprint sensor 220 at generation of the calibration image 403 and a location of the fingerprint sensor 220 at acquisition of the image 402 are different from each other, a value of the calibration image 403 pre-stored in the memory 340 cannot remove the noise of the image 402, or may not be as effective at removing the noise. Similarly, when the fingerprint sensor 220 is moved at acquisition of a fingerprint, noise in the acquired fingerprint image cannot be removed (or may be more difficult to remove using calibration image 403), and accordingly, a fingerprint recognition rate may be reduced.

The sensor controller 335 can carry out a process for correcting the calibration image data. The sensor controller 335 can change or update (e.g., correct) the calibration image data periodically or by a user's choice (e.g., the user may trigger the sensor controller 335 to correct the calibration data). The sensor controller 335 can correct the calibration image data even when sensing is carried out due to an impact applied to the display device 100 by other sensors (e.g., a gyro sensor, a temperature sensor, an air-pressure sensor, a humidity sensor, and the like) included in the display device 100. The sensor controller 335 can correct the calibration image data when an impact applied to the display device 100 is sensed by other sensors.

Specifically, the sensor controller 335 may correct the calibration image data by controlling the display portion 202 to display a test image and controlling the fingerprint sensor 220 to acquire the displayed test image. The sensor controller 335 can correct the calibration image data by calculating a movement amount of the fingerprint sensor 220 by using the test image acquired by the fingerprint sensor 220.

The memory 340 may store image profile data according to test image data, calibration image data, and a test image displayed at generation of the calibration image data.

Two or more of the touch controller 315, the display controller 325, and the sensor controller 335 may be integrated as one configuration. For example, the touch controller 315, the display controller 325, and the sensor controller 335 may be implemented as a single integrated circuit (IC).

Next, referring to FIG. 5, a method for storing calibration image data will be described.

Figure 5:
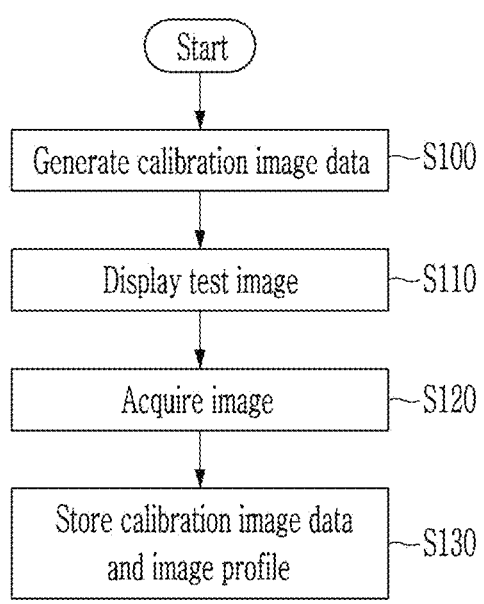
FIG. 5 is a flowchart of a method for storing calibration image data of the display device according to embodiments of the present disclosure.

FIG. 5 is a flowchart of a method for storing calibration image data of the display device according to embodiments of the present disclosure.

After the fingerprint sensor 220 is combined with (e.g., attached to or fixed relative to) the display panel 200, calibration image data is generated (S100). The sensor controller 335 may generate the calibration image data through image data acquired through the fingerprint sensor 220 in a specific environment (e.g., an environment in which a specific reflector approaches the fingerprint sensor 220 while irradiating constant light in a dark room condition). The calibration image data may include (e.g., may represent or reflect) a process deviation of light sensing pixels included in the fingerprint sensor 220 and noise due to a light path obstacle due to the display panel 200.

Next, the display portion 202 displays a test image (S110). For example, the sensor controller 335 may control the display controller 325 to output a control signal and test image data such that the display portion 202 can display the test image. The test image may include at least one marker.

Next, the fingerprint sensor 220 acquires an image while the test image is displayed (S120). The image acquired by the fingerprint sensor while the test image is displayed may be referred to hereinafter as "the first image."

The sensor controller 335 calculates an image profile from the first image, and stores initially generated calibration image data in the memory 340 in association with the calculated image profile (S130).

The above-described steps S110, S120, and S130 will now be described with reference to FIG. 6.

Figure 6:
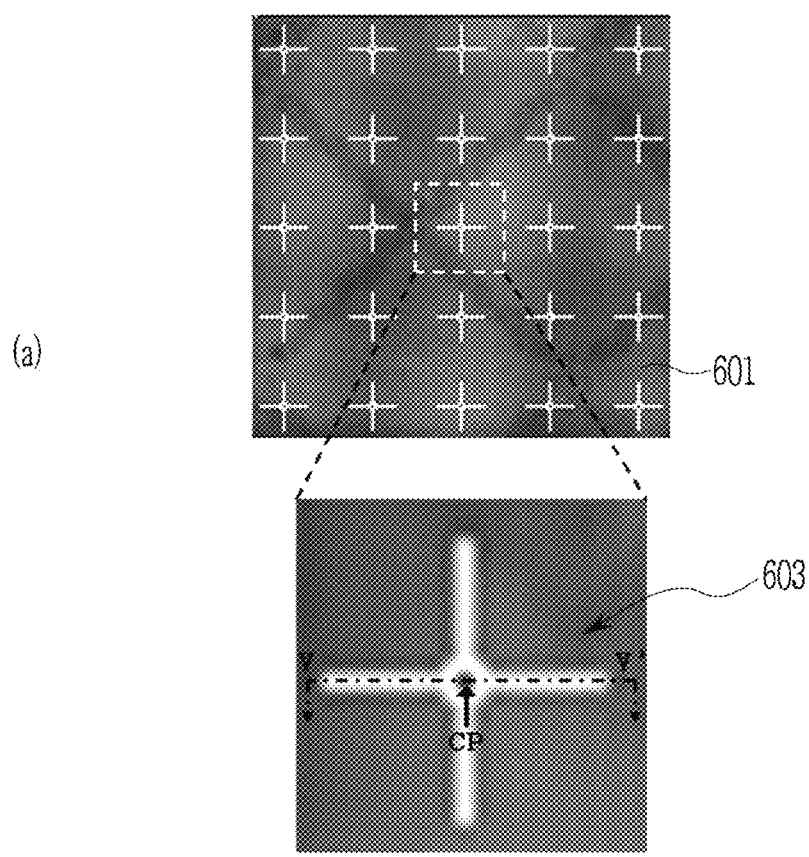
FIG. 6 shows a test image displayed by the display portion and a profile of an image acquired by the fingerprint sensor according to embodiments of the present disclosure.
Figure 6:
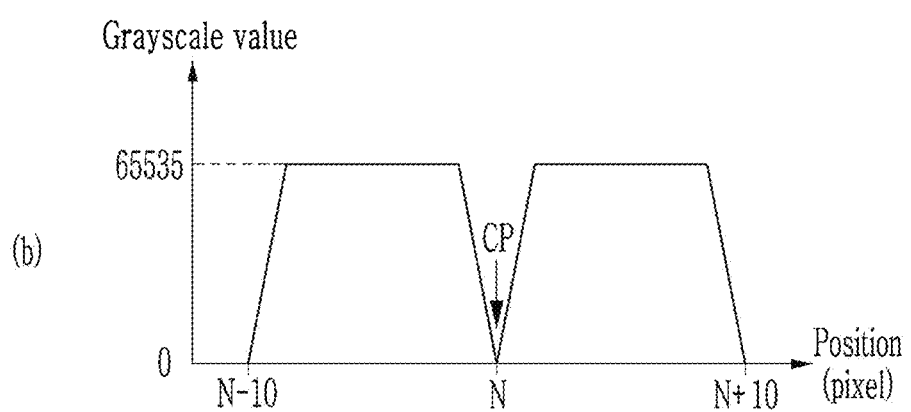

FIG. 6 shows a test image displayed by the display portion and a profile of an image acquired by the fingerprint sensor.

As shown in (a) of FIG. 6, a test image 601 may include at least one marker 603. In some embodiments, the marker 603 may have a center point CP and may be cross- or X-shaped, crossing at the center point CP. The image may be grayscale, the cross- or X-shaped portion may have a white grayscale value, and the center point CP may have a black grayscale value. The white grayscale value may be the highest greyscale value (e.g., 65535), and the black grayscale value may be the lowest greyscale value (e.g., zero).

Other suitable shapes for the marker that could be used to calculate the movement amount on an image acquired by the fingerprint sensor 220 will be apparent to those of skill in the art, can be utilized in some embodiments, and are considered to be within the scope of the present disclosure.

FIG. 6 (b) shows an image profile (e.g., an x-directional image profile) acquired along the line V-V' of the marker 603 in the image acquired by the fingerprint sensor 220. In the image profile, it can be determined that a portion N corresponding to the center point CP of the marker 603 has a grayscale value of 0, and portions N−10 to N and portions N to N+10 corresponding to horizontal bars of the cross-shaped portion have grayscale values of 65535. The sensor controller 335 may store image profile data according to (e.g., generated based on) display of the test image 601 at generation of the calibration data by calculating the x-axis coordinates, y-axis coordinates, and grayscale value of the center point CP of one or more marker 603 (e.g., each marker 603).

Next, referring to FIG. 7, a method for acquiring a fingerprint where noise is removed even after the fingerprint sensor 220 is moved will be described.

Figure 7:
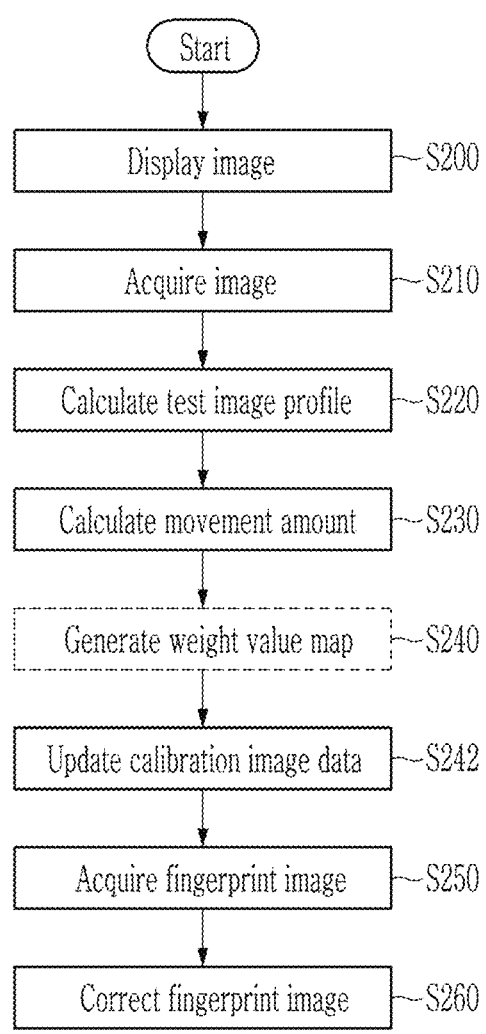
FIG. 7 is a flowchart of a method for acquiring a fingerprint utilizing the display device according to embodiments of the present disclosure.

FIG. 7 is a flowchart of a method for acquiring a fingerprint utilizing the display device according to embodiments of the present disclosure.

As previously described, the sensor controller 335 may carry out a series of processes to change or update (e.g., correct) the calibration image data. The sensor controller 335 may periodically, or upon receiving a command (e.g., from the user), correct the calibration image data.

The display portion 202 displays a test image (S200). For example, the sensor controller 335 may output a control signal and a test image signal to the display controller 325 such that the display portion 202 can display the test image.

The test image may be displayed such that it is invisible to a user or difficult for the user to view or perceive. For example, the sensor controller 335 may cause the test image to be displayed when the display device 100 is turned on, or may cause the test image to be displayed when the display device 100 is turned off. In some embodiments, the display device 100 is included in a mobile terminal (e.g., a smart phone), and calibration image data correction can be carried out through displaying of a test image when entering a lock mode or releasing the lock mode.

Next, the fingerprint sensor 220 acquires an image while the test image is displayed (S210).

The sensor controller 335 calculates an image profile from the first image (S220).

The sensor controller 335 compares an image profile stored in the memory 340 with the image profile calculated at step S220, and calculates a movement amount of at least one marker (S230).

The steps S220 and S230 will be described with reference to FIG. 8 to FIG. 12.

FIGS. 8-12 show profiles of images acquired by the fingerprint sensor 220 when the fingerprint sensor 220 has moved along the x-axis direction (e.g., since generation of calibration image data) according to embodiments of the present disclosure.

Figure 8:
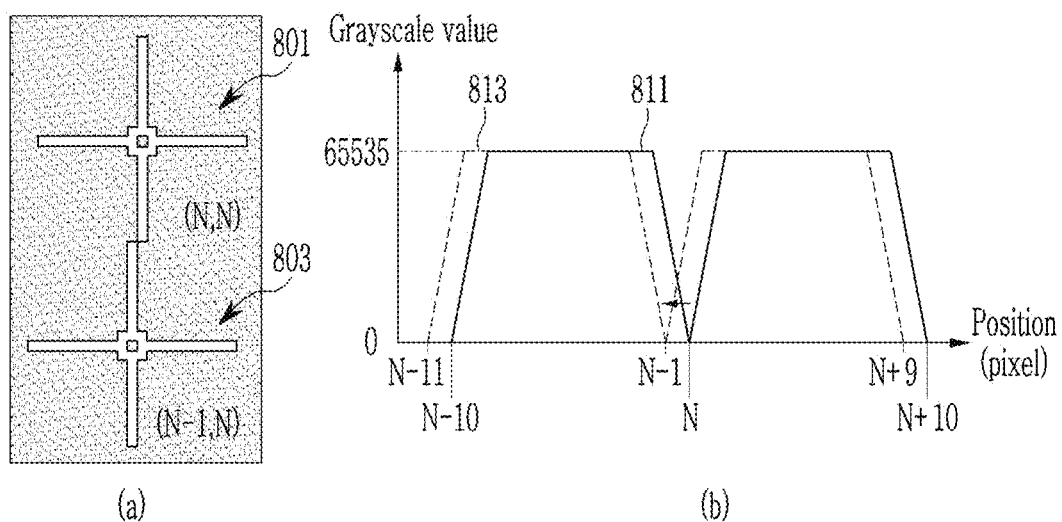
FIGS. 8-12 show profiles of images acquired by the fingerprint sensor when the fingerprint sensor has moved along the x-axis direction according to embodiments of the present disclosure.

As shown in (a) of FIG. 8, when the center point CP of a marker is positioned at (N,N) (801) at generation of calibration image data, an image profile 811 of (b) of FIG. 8 is calculated along the x-axis direction.

As shown in (a) of FIG. 8, when the center point CP of the marker is positioned at (N−1,N) (803) after the fingerprint sensor 220 is moved, an image profile 813 of (b) of FIG. 8 is calculated along the x-axis direction.

When the image profile 811 and the image profile 813 are compared, it can be determined that the x-axis coordinate having the lowest grayscale value (0) is moved to N−1 from N when the movement amount of the corresponding marker is −1.

Figure 9:
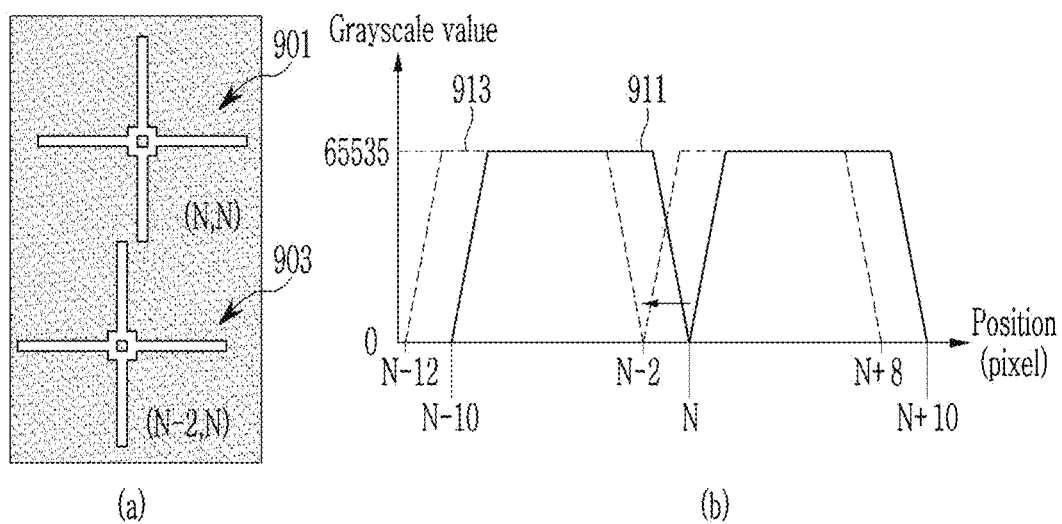

As shown in (a) of FIG. 9, when a center point CP of a marker is positioned at (N,N) (901) at generation of calibration image data, an image profile 911 of (b) of FIG. 9 is calculated along the x-axis direction.

As shown in (a) of FIG. 9, when the center point CP of the marker is positioned at (N−2,N) (903) after the fingerprint sensor 220 is moved, an image profile 913 of (b) of FIG. 9 is calculated along the x-axis direction.

When the image profile 911 and the image profile 913 are compared, it can be determined that an x-axis coordinate having a minimum grayscale value (0) is moved to N−2 from N when a movement amount of the corresponding marker is −2.

As shown in FIG. 8 and FIG. 9, a movement amount of the marker can be calculated by using x-axis coordinates having minimum grayscale values in the image profiles 813 and 913.

Figure 10:
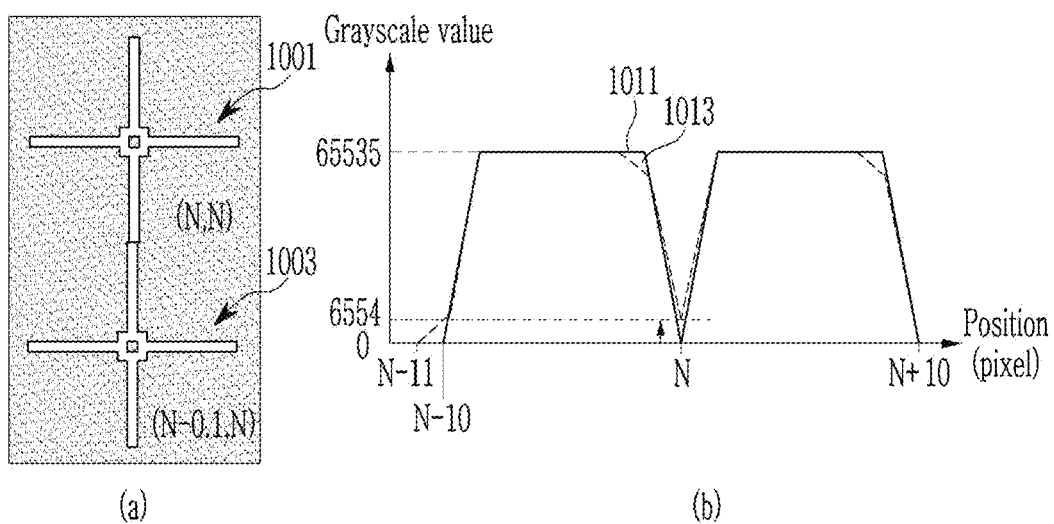

As shown in (a) of FIG. 10, when a center point CP of a marker is positioned at (N,N) (1001) at generation of calibration image data, an image profile 1011 of (b) of FIG. 10 is calculated along the x-axis direction.

As shown in (a) of FIG. 10, when the center point CP of the marker is positioned at (N−0.1,N) (1003) after the fingerprint sensor 220 is moved, an image profile 1013 of (b) of FIG. 10 is calculated.

When the image profile 1011 and the image profile 1013 are compared, it can be determined that the minimum grayscale value is increased to 6554 from 0 when a movement amount of the corresponding marker is −0.1.

Figure 11:
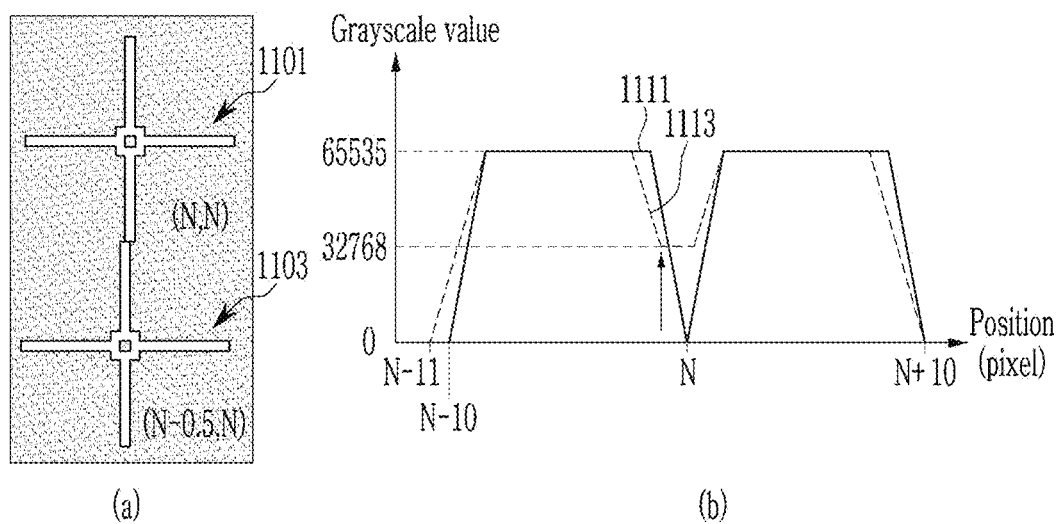

As shown in (a) of FIG. 11, when a center point CP of a marker is positioned at (N,N) (1101) at generation of calibration image data, an image profile 1111 of (b) of FIG. 11 is calculated along the x-axis direction.

As shown in (a) of FIG. 11, when the center point CP of the marker is positioned at (N−0.5,N) (1103) after the fingerprint sensor 220 is moved, an image profile 1113 of (b) of FIG. 11 is calculated along the x-axis direction.

When the image profile 1011 and the image profile 1113 are compared, it can be determined that the minimum grayscale value is increased to 32768 from 0 when a movement amount of the marker is −0.5.

Figure 12:
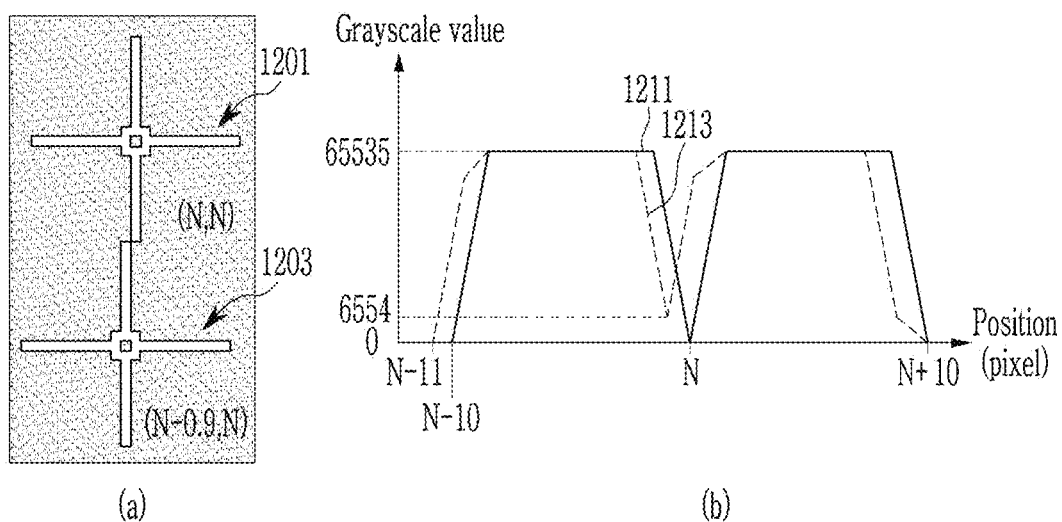

As shown in (a) of FIG. 12, when a center point CP of a marker is positioned at (N,N) (1201) at generation of calibration image data, an image profile 1211 of (b) of FIG. 12 is calculated along the x-axis direction.

As shown in (a) of FIG. 12, when the center point CP of the marker is positioned at (N−0.9,N) (1203) after the fingerprint sensor 220 is moved, an image profile 1213 of (b) of FIG. 12 is calculated along the x-axis direction.

When the image profile 1211 and the image profile 1213 are compared, it can be determined that the minimum grayscale value is increased to 6554 from 0 when a movement amount of the corresponding marker is −0.9.

As shown in FIG. 10, FIG. 11, and FIG. 12, a movement amount of a marker can be determined (e.g., calculated) by using variation of a minimum grayscale value in the image profiles 1013, 1113, and 1213. Although the image profile 1013 and the image profile 1213 have the same minimum grayscale value, a movement amount of the marker of each of the two image profiles 1013 and 1213 can be distinguished based on the position (e.g., the x-axis coordinate) at which the minimum grayscale value is located.

Figure 13:
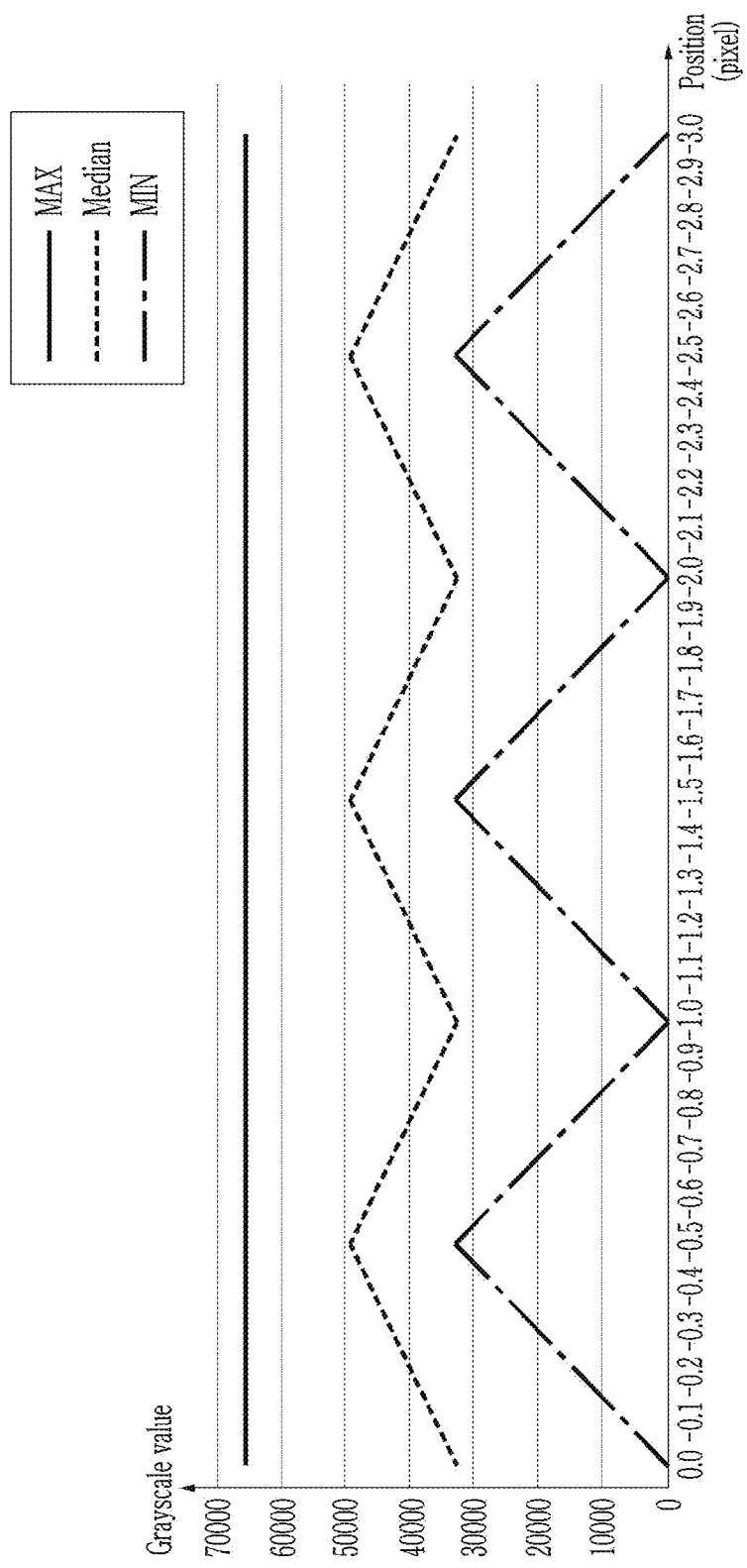
FIG. 13 is a graph that shows variations of a maximum grayscale value, a minimum grayscale value, and a median grayscale value of profiles of images acquired by the fingerprint sensor when the fingerprint sensor has moved along the x-axis direction (e.g., the images of FIG. 9 to FIG. 12).

The movement amount of a marker, and maximum, minimum, and median grayscale values of profiles of test images (e.g., the profiles of the test images shown in FIG. 9 to FIG. 12) associated with a given movement amount, can be shown as in FIG. 13.

FIG. 13 is a graph that shows variations of the maximum grayscale value, the minimum grayscale value, and a median grayscale value of profiles of images acquired by the fingerprint sensor 220 when the fingerprint sensor 220 has moved along the x-axis (e.g., the images of FIG. 9 to FIG. 12).

As shown in FIG. 13, a movement amount of a marker can be determined using (e.g., using in part) the variations of the minimum grayscale value and/or the median grayscale value of the profile of the image corresponding to the marker.

Referring back to FIG. 7, the sensor controller 335 may generate a weight value map using the movement amount of the marker (S240). The weight value map may be generated using a position of at least one marker and a movement amount of the marker. In particular, the weight value map can be generated when the fingerprint sensor 220 moves in the z-axis direction.

The weight value map will be described with reference to FIG. 14.

Figure 14:
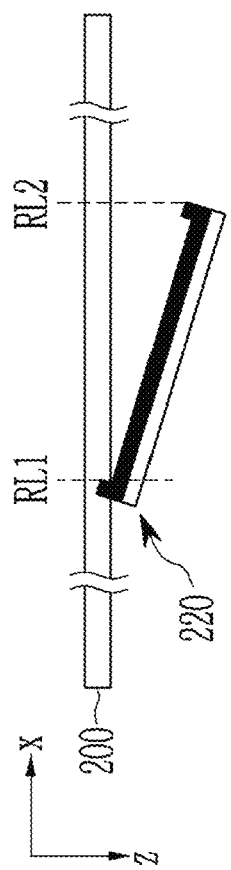
FIG. 14 illustrates an image acquired by the fingerprint sensor ("a first image"), an x-axis weight value map, and a y-axis weight value map according to embodiments of the present disclosure.
Figure 14:
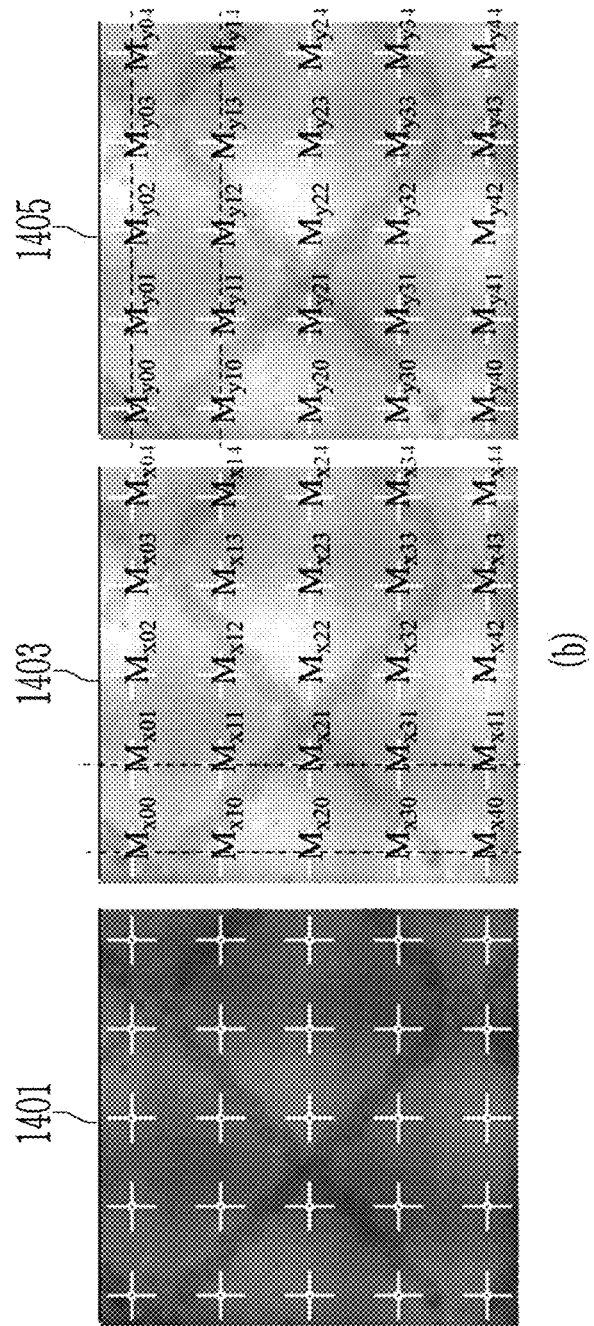

FIG. 14 illustrates an image acquired by the fingerprint sensor 220, an x-axis weight value map, and a y-axis weight value map according to embodiments of the present disclosure.

As shown in (a) of FIG. 14, a first image 1401 (e.g., an image of the test image shown by the display portion 202) of (b) of FIG. 14 is acquired by the fingerprint sensor 220 when the fingerprint sensor 220 (e.g., a portion of the fingerprint sensor 220) is distanced from the display panel 200 in the z-axis direction. Although the fingerprint sensor 220 is attached to the display panel 200 near the reference line RL1, there is space between the fingerprint sensor 220 and the display panel 200 at the reference line RL2. Thus, a movement amount of a marker acquired by the fingerprint sensor 220 near the reference line RL1, is greater than a movement amount of a marker acquired by the fingerprint sensor 220 near the reference line RL2. When a movement amount of each marker on the first image 1401 is calculated at step S230, movement amount values at locations between the respective markers can be calculated through interpolation. As shown in (b) of FIG. 14, an x-axis weight value map 1403 which includes x-axis movement amounts at positions between the respective markers can be generated (e.g., through interpolation) using x-axis movement amounts $M_{x00}$ to $M_{x44}$ of each marker, and a y-axis weight value map 1405 which includes y-axis movement amounts at positions between the respective markers can be generated (e.g., through interpolation) using the y-axis movement amounts $M_{y00}$ to $M_{y44}$ of each marker.

The sensor controller 335 may correct calibration image data (e.g., may change, update, or generate new calibration image data to reflect the movement of the fingerprint sensor 220) by using a weight value map (S242). For example, the sensor controller 335 may correct calibration image data by applying a weight value map to each image pixel of the calibration image data and a grayscale value that corresponds to each image pixel. In some embodiments, the grayscale values corresponding to image pixels are moved to correspond with different image pixels based on the weight in the weight value map at the corresponding location in the weight map. When the fingerprint sensor 220 moves only on the xy plane, the sensor controller 335 can correct the calibration image data by using a movement amount of a marker, calculated at S230, without using the weight value map. Accordingly, in some embodiments, when the respective markers have the same movement amount, the sensor controller 335 may determine that the fingerprint sensor 220 moved only on the xy plane, may correct the calibration image data by using the movement amount, and in some embodiments may abstain from generating a weight value map.

When a user's finger approaches, the sensor controller 335 may acquire a fingerprint image (S250).

The sensor controller 335 may correct the acquired fingerprint image by applying calibration image data (e.g., updated calibration image data or the most recent calibration image data) to the acquired fingerprint image (S260).

FIG. 15 is a table that shows standard deviation values of fingerprint images acquired by using corrected calibration data according to embodiments of the present disclosure (e.g., standard deviation values between a test image and an image acquired by the fingerprint sensor 220). The table includes five entries, and for each entry lists values for the amount of movement of the fingerprint sensor 220 (Raw (Shift)), the amount of correction applied to the calibration data (CAL Data(Shift)), the maximum grayscale value (MAX), the minimum grayscale value (MIN), the median grayscale value (AVG), and the standard deviation (STDEV).

As shown in FIG. 15, when the fingerprint sensor 220 is not moved and no correction is carried out on calibration image data, a standard deviation value is 0. However, when the fingerprint sensor 220 is moved and thus a marker is moved as much as 0.3 pixels, the standard deviation value is increased to 582.01622. In addition, when the fingerprint sensor 220 is moved and thus a marker is moved as much as 1.5 pixels, the standard deviation value is further increased to 1172.823. That is, although a fingerprint image is corrected by using calibration data (e.g., un-corrected or un-updated calibration data), noise of the fingerprint image is not removed or not entirely removed subsequent to movement of the fingerprint sensor 220.

It can be determined that when a calibration image is updated or corrected corresponding to a movement amount of a marker according to embodiments of the present disclosure, a standard deviation STDEV may be 0.2862287 when the fingerprint sensor 220 is moved and thus the marker is moved as much as 0.3 pixels, and the standard deviation STDEV may be 0.2499993 when the fingerprint sensor 220 is moved and thus the marker is moved as much as 1.5 pixels. That is, even when the fingerprint sensor 220 is moved, noise of the fingerprint image can be removed by correcting the fingerprint image by using a corrected calibration image.

According to embodiments of the present disclosure, even when the fingerprint sensor 220 is moved, a fingerprint image in which noise is reduced or removed can be acquired.

In addition, according to embodiments of the present disclosure, calibration image data is not generated again, a fingerprint image in which noise is reduced or removed can be acquired even when the fingerprint sensor 220 is moved after shipment of the product.

Further, according to embodiments of the present disclosure, a fingerprint recognition rate can be improved compared to a related art even when the fingerprint sensor 220 is moved.

While this invention has been described in connection with exemplary embodiments thereof, it is to be understood that the embodiments described are exemplary, and are not exhaustive and are not intended to limit the scope of the invention. Persons skilled in the art to which this invention pertains will appreciate that alterations and changes can be made to the above embodiments without departing from the spirit or scope of the invention set forth in the following claims and equivalents thereof.

What is claimed is:

1. A display device comprising:
a display portion comprising a plurality of pixels;
a sensor comprising a plurality of light sensing pixels configured to receive light, and to acquire a first image when the display portion displays a test image that includes a marker and to acquire a fingerprint image;
a memory configured to store calibration image data for calibrating an image acquired by the sensor and a first image profile, the first image profile being acquired at generation of the calibration image data by displaying the test image by the display portion; and
a sensor controller configured to generate a second image profile from the first image and to calculate a movement amount of the marker by comparing the first image profile with the second image profile to update the calibration image data using the movement amount of the marker, and to apply the updated calibration image data to the fingerprint image.

2. The display device of claim 1, wherein:
the calibration image data comprises a plurality of image pixels, each having a grayscale value, and
the sensor controller is configured to generate a weight value map by calculating the movement amount of the marker, and to apply the weight value map to the plurality of image pixels in the calibration image data to correct the calibration image data.

3. The display device of claim 1, wherein the marker has an X-shape including a center point having a black grayscale value and an X-shaped portion having a white grayscale value.

4. The display device of claim 3, wherein the sensor controller is configured to calculate the movement amount of the marker by comparing a position corresponding to a minimum grayscale value of the marker in the first image profile with a position corresponding to a minimum grayscale value of the marker in the second image profile.

5. The display device of claim 3, wherein the sensor controller is configured to calculate the movement amount of the marker by comparing a minimum grayscale value of the marker in the first image profile with a minimum grayscale value of the marker in the second image profile.

6. The display device of claim 1, wherein the sensor is at a rear side of the display portion.

7. The display device of claim 6, wherein:
the display portion comprises a display area where an image is displayed and a non-display area at at least one side of the display area, and
the sensor corresponds to a fingerprint sensing area in the display area.

8. The display device of claim 7, further comprising:
a touch sensor that is at a front side of the display portion; and
a window that is at a front side of the touch sensor.

9. The display device of claim 8, wherein when the touch sensor senses a touch at a touched area in the fingerprint sensing area, the display portion is configured to control pixels at the touched area to emit light, and the sensor is configured to drive light sensing pixels at the touched area.

10. A method of controlling a display device, comprising:
acquiring a first image, by a sensor that includes a plurality of light sensing pixels, when a display portion of the display device displays a test image that includes a marker;
calculating a movement amount of the marker from the first image;
updating calibration image data based on the movement amount of the marker, wherein the calibration image data is to be applied to a fingerprint image acquired by the sensor;
acquiring a fingerprint image, by the sensor;
applying the updated calibration image data to the fingerprint image,
wherein the calculating a movement amount of the marker from the first image comprises:
generating a second image profile from the first image; and
calculating the movement amount of the marker by comparing the second image profile with a first image profile acquired at generation of the calibration image data by displaying, by the display portion, the test image.

11. The method of claim 10, wherein:
the calibration image data comprises a plurality of image pixels, each having a grayscale value, and
the updating the calibration image data comprises:
generating a weight value map by calculating the movement amount of the marker, and
applying the weight value map to the plurality of image pixels in the calibration image data.

12. The method of claim 10, wherein the marker has an X-shape with a white grayscale value with a center point having a black grayscale value.

13. The method of claim 12, wherein the calculating the movement amount of the marker comprises comparing a position corresponding to a minimum grayscale value of the marker in the first image profile with a position corresponding to a minimum grayscale value of the random marker in the second image profile.

14. The method of claim 12, wherein the calculating the movement amount of the marker comprises comparing a minimum grayscale value of the marker in the first image profile with a minimum grayscale value of the marker in the second image profile.

15. The method of claim 10, wherein:
the display portion comprises a display area where an image is displayed and a non-display area at at least one side of the display area, and
the sensor corresponds to a fingerprint sensing area in the display area.

16. The method of claim 15, wherein the acquiring a first image comprises:
sensing, by a touch sensor, a touch at a touched area in the fingerprint sensing area;
emitting light, by the display portion, from pixels located in the touched area; and
driving, by the sensor, light sensing pixels located in the touched area.

* * * * *